Dec. 11, 1928.

E. A. HALL 1,694,742

APPARATUS FOR HARVESTING ARTIFICIAL ICE

Filed Aug. 6, 1927   3 Sheets-Sheet 1

INVENTOR
Edward A. Hall
By Charles B. Mann Jr.
ATTORNEY

Dec. 11, 1928.
E. A. HALL
1,694,742
APPARATUS FOR HARVESTING ARTIFICIAL ICE
Filed Aug. 6, 1927      3 Sheets-Sheet 2
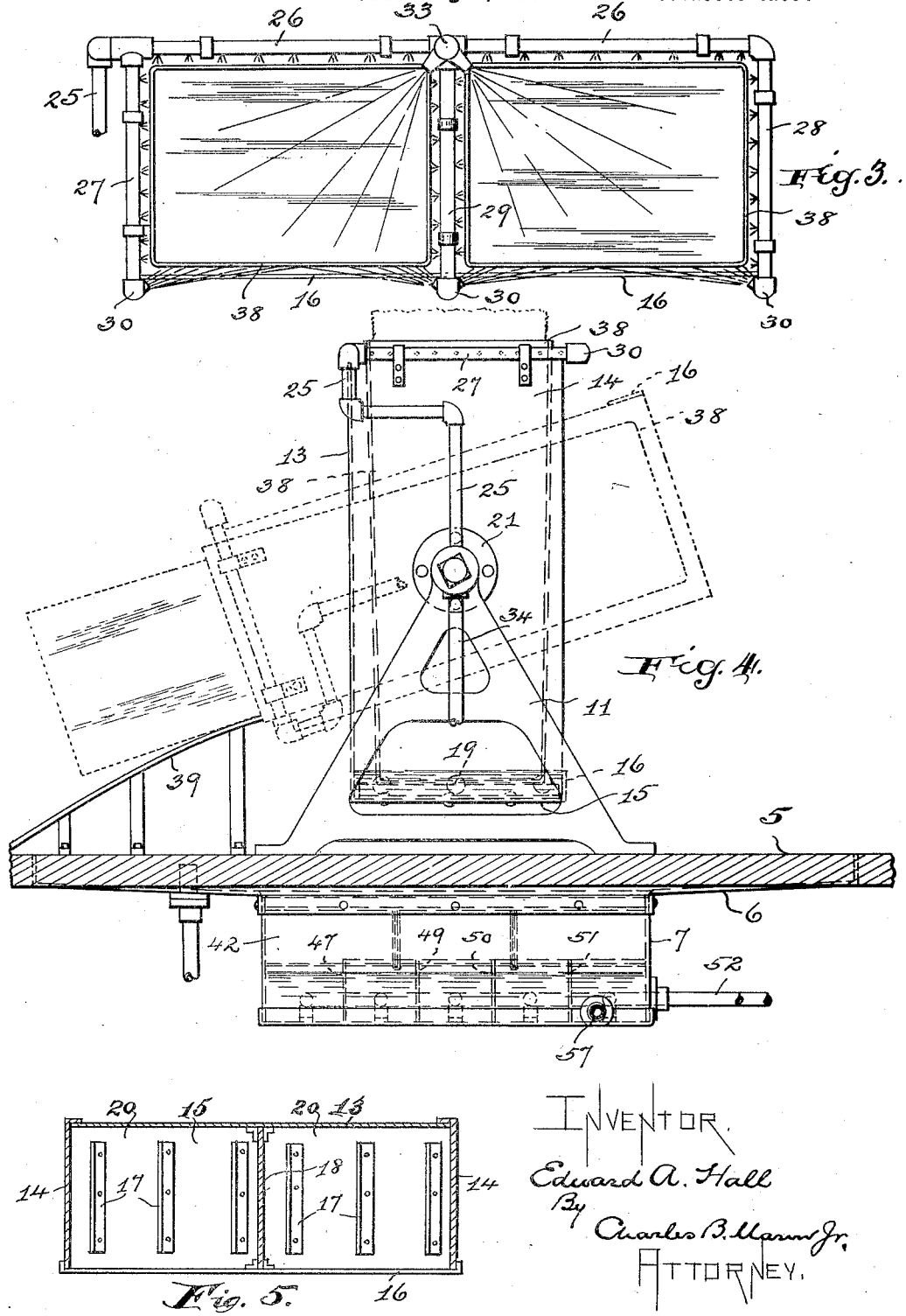

Dec. 11, 1928.
E. A. HALL
1,694,742
APPARATUS FOR HARVESTING ARTIFICIAL ICE
Filed Aug. 6, 1927
3 Sheets-Sheet 3
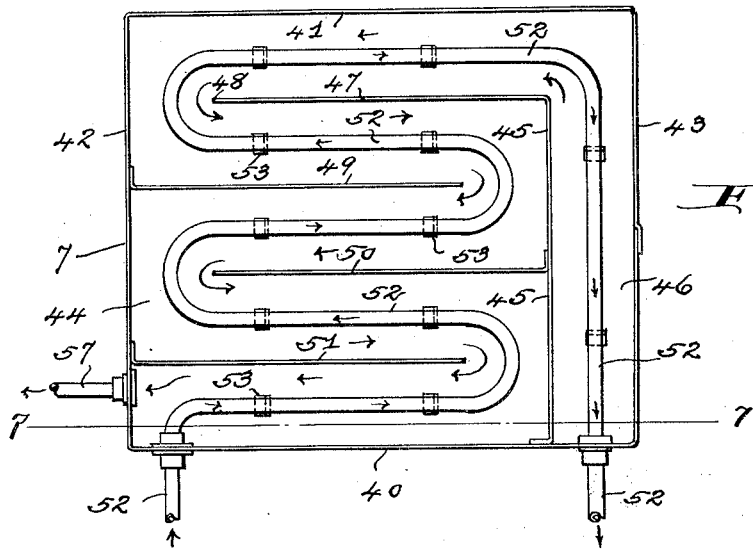
Fig. 6.
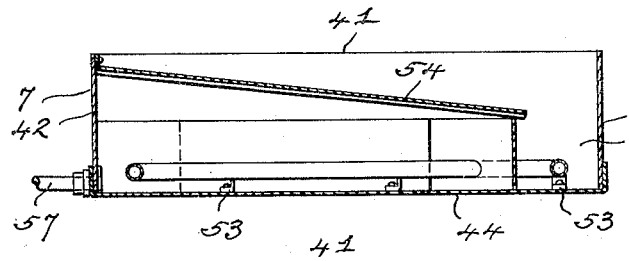
Fig. 7.
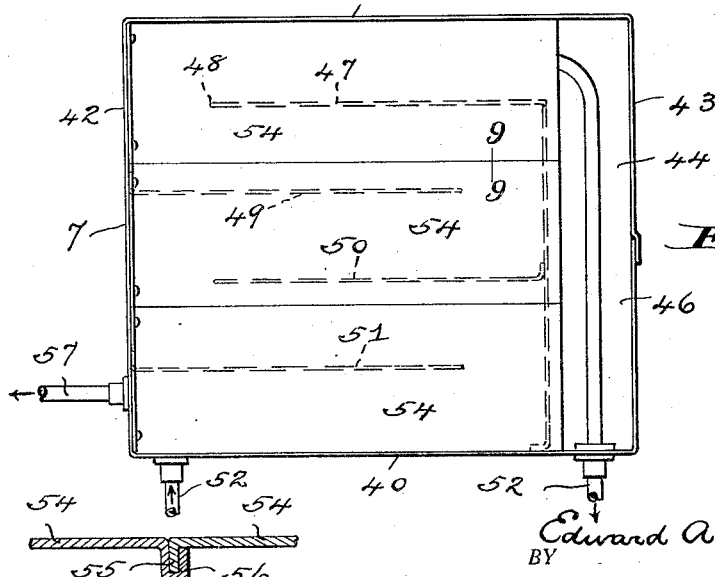
Fig. 8.
Fig. 9.
INVENTOR.
Edward A. Hall
BY
Charles B. Mann Jr.
ATTORNEY.

Patented Dec. 11, 1928.

1,694,742

UNITED STATES PATENT OFFICE.

EDWARD A. HALL, OF BALTIMORE, MARYLAND.

APPARATUS FOR HARVESTING ARTIFICIAL ICE.

Application filed August 6, 1927. Serial No. 211,076.

This invention relates to the harvesting of artificial ice and has particular reference to facilitating the prompt removal of the ice blocks from the cans in which they have been frozen immediately after the cans containing the ice have been removed from the freezing tank.

As generally practiced today, the cans containing the ice are removed singly or in groups from the freezing tank and are then allowed to temper in the open air, that is,— allowed to stand until their temperature rises.

After the delay in tempering the ice, the cans in some instances are placed in a warm water tank to loosen the ice from the can or are placed in a sprinkler dump that directs warm water against the can, while the latter is held in an inclined position, until the block of ice frees itself and can be dumped out of the can.

In both of the above-mentioned methods, there is considerable loss of time, labor, power and refrigeration, due to the tempering, because it requires labor to place the cans for the tempering; it takes time to effect the tempering; it calls for power to handle the cans twice,—first, to place them for tempering and then remove them after tempering and either put them in the warm water tank or the sprinkler.

Then too, when the cans are placed in an inclined position in the sprinkler dump and warm water run over them, the blocks of ice frequently stick as they begin to slide out of the can and the warm water then flows over the ice block and melts the latter, causing a waste and loss of ice.

I have discovered that I can avoid the loss of time now consumed in the tempering operation together with the labor of double-handling; that I can readily free the ice blocks from the cans by placing them in a specially-designed sprinkler dump arranged to hold one can or a battery of cans; that I can free the ice by water of a temperature very much lower than the temperature of water from city mains, and that the chilled water flowing off the can of ice can be utilized for chilling the water supply from which the empty cans are filled to go into the freezing tank so that the water in the cans when entering the freezing tank will be of a low temperature and freezing thereof thus facilitated.

By means of my invention, I am also able to free the ice in the cans while the latter are in an upright position, and to cause the blocks of ice to float free in the upright can before the cans are tilted to dump the ice and in this way I avoid sticking of the ice blocks and running water over them while they are in the inclined dumping position.

The apparatus for carrying out the invention is illustrated in the accompanying drawings, wherein,—

Fig. 3 shows the dump in top view.

Fig. 4 illustrates the apparatus in side elevation.

Fig. 5 shows on a reduced scale a cross-section through the dump showing the same as viewed on the line 5—5 of Fig. 1.

Fig. 6 illustrates the chilled water receiving-tank in top view with the top plates removed.

Fig. 7 shows a cross-sectional detail through the same,—the section being taken on the line 7—7 of Fig. 6.

Fig. 8 illustrates a top view of the tank with the drain-plates in position, and Fig. 9 shows an enlarged sectional detail through the engaged edges of the top plates as viewed on the line 9—9 of Fig. 8.

Figure 1:
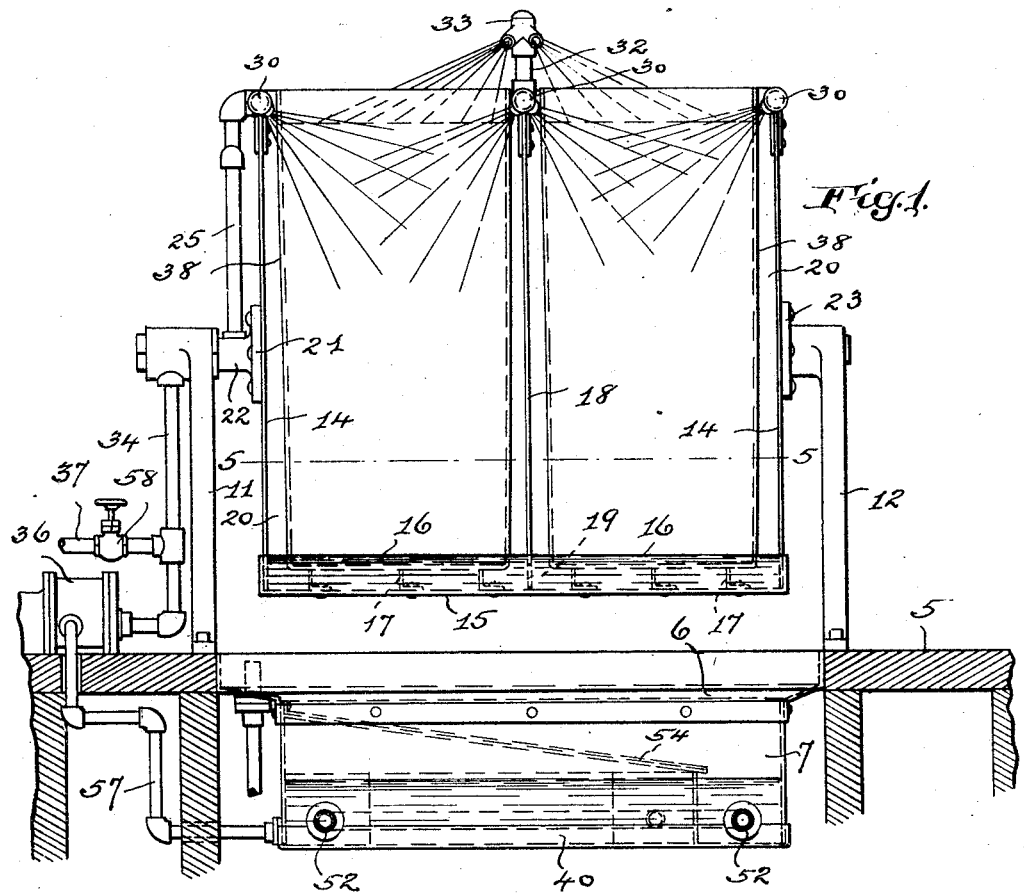
Fig. 1 shows the apparatus partly in section and part in front elevation.
Figure 2:
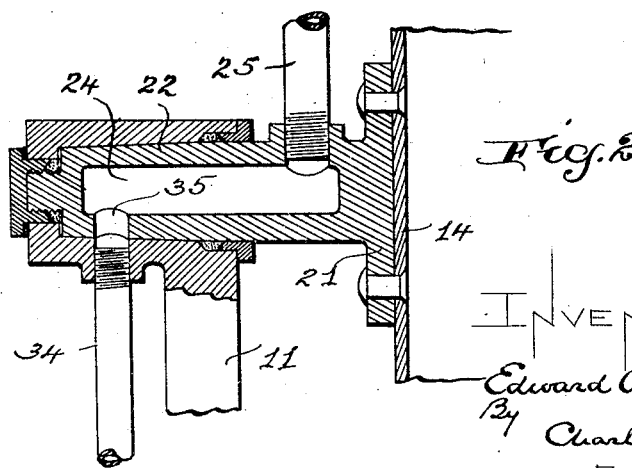
Fig. 2 illustrates an enlarged sectional detail through one of the water cut-off trunnions which supplies water only when the dump is upright.

In the drawings, the numeral 5 designates a platform, floor or equivalent supporting structure on which the dump mechanism is supported and in the bottom of this platform, I locate a trough or hopper 6. Beneath this hopper, I provide a tank 7 in which I distribute a series of pipe coils, which coils are interposed in the fresh water supply pipe system from which water is drawn to fill the cans, which water is to be frozen in the freezing tank, as will presently be more fully explained.

An overflow pipe may be provided to carry off excess chilled water from the coil-cooling tank as will also presently be explained.

The dumping apparatus is sustained above the hopper and cooling tank, and has two side bearing brackets or supports 11 and 12 respectively between which the dump is pivotally sustained.

While the dump may readily be made to receive one, two or more cans of ice, in this instance, I show a structure that is designed to accommodate two cans.

The dump, in this instance, is constructed of heavy sheet-metal plates and has a vertical rear wall 13; two vertical side walls 14, and a bottom 15.

While the front of the dump is open from the top down, I prefer to provide a cross-plate 16 across the front that extends upwardly a short distance above the bottom whereby to form a shallow receptacle in the bottom.

On the bottom 15, I locate a plurality of angle-plates 17, which extend in a direction from front to rear merely to serve as elevated supports on which the bottoms of the cans may rest when placed in the dump so the cans will be supported in a slightly elevated position above the bottom.

The angle-plates 17 are shorter than the front to rear depth of the bottom receptacle of the dump so that water may be circulated over the bottom beneath the cans and around the ends of the angle-plates.

In the present instance, I provide a vertical partition-plate 18 in the dump which extends downwardly from the top and near its bottom edge has a series of holes or passages 19, to provide communication from one side to the other of said partition.

The partition 18 serves to provide separate compartments 20 of a size to accommodate a can of ice.

One side wall 14, of the dump is attached to a trunnion bracket 21, whose trunnion 22, fits into and is supported by a chambered upper end of the bracket or support 11 while the opposite-side wall 14 of the dump has a trunnion bracket 23, that is pivotally supported in the bracket 12.

The two supports or brackets 11 and 12 therefore pivotally sustain the dump between them.

The trunnion 22, has a chamber 24 therein and a pipe 25 leads from said chamber and extends to the upper edge of the dump-wall where connections and branches are provided so that one pipe 26 will extend along the upper rear edge of the dump; another pipe 27 will extend along the upper edge of one side wall 14; another pipe 28 will extend along the opposite side wall, and another pipe 29, will extend horizontally over the partition wall 18.

All of the pipes 26, 27, 28 and 29 have horizontal positions and the pipes 27, 28, and 29 extend at right angles to the rear pipe 26.

By reference to Fig. 3 of the drawings, it will be seen that the pipes 27, 28 and 29 have nozzles 30 at their outer ends and that each of said pipes and their nozzles have outlets from which jets of water or other fluid may be directed laterally and downwardly into the receptacles or compartments of the dump as and for a purpose that will presently be more fully explained.

It will also be noted, by reference to Figs. 1 and 3 of the drawings that at the junction of the pipe 29 with the pipe 26, I provide an up-standing pipe 32, with a nozzle structure 33 at the upper end thereof and that the jets of fluid discharged by this nozzle are directed downwardly and laterally at opposite sides of the partition wall 18.

The chambered upper end of dump-supporting bracket 11, receives the trunnion 22 in which the chamber 2 is located and a pipe 34, enters the chambered end of the bracket, and, when the dump is in an upright or vertical position, this pipe communicates with a port 35 in the trunnion 22 so that fluid may then pass from the pipe 34 into the trunnion-chamber 24 and then pass through pipe 25 to be distributed through and discharged from the branch pipes 26, 27, 28 and 29.

The pipe 34 from the trunnion-chamber leads to and connects with a pump 36 while a branch pipe 37 extends from said pipe 24 for a purpose that will presently be explained.

The tank 7 is located beneath the dump so that the chilled water running from the cans 38 during the brief thawing operation to free the ice blocks from the cans, may be collected in the said tank 7 and utilized for again spraying over ice cans and also for chilling water flowing through service pipes which is utilized to fill the cans for freezing into ice.

The tank 7 is shown in detail in Figs. 6 to 9 inclusive of the drawings, to which particular reference will now be made.

The tank 7 has front and rear vertical walls 40, 41; side walls 42, 43 and a bottom 44.

A partition 45, extends from the front wall 40, toward the rear wall 41, and while it is parallel to the side wall 43, it is spaced therefrom so as to form a channel 46 extending fore and aft of the tank.

The cross-wise partition 47, terminates at a point 48 that is spaced from the side wall 42 so as to provide a passage around that end.

Between the front wall 40 and the cross-wise partition 47, I provide in the tank a plurality of vertical partitions 49—50 and 51,—the partitions 49 and 51 extending from the side wall 42 toward but spaced from the fore and aft partition 45 and the partition 50 extending from the partition 45 toward but spaced from the side wall 42. The partitions 48, 49, 50 and 51 are therefore arranged to provide a tortuous passage from the channel 46 around the ends of the several partitions back toward the front wall 40 of the tank.

A pipe 52 enters the front wall 40 and extends through the tortuous passage of the tank from front to rear and then extends forwardly through the side channel 46 and passes out through the front wall, as clearly shown in Fig. 6 of the drawings.

This pipe 52 is connected to the water supply system from which water is drawn to fill the cans to be frozen and the water passing through the pipe is to be chilled so its temperature will be low when it is put into the cans.

The pipe is preferably supported on brackets 53 on the bottom of the tank so as to elevate the pipe slightly.

Over the partitions, I provide the tank with inclined cover plates 54 which latter incline downwardly from the side wall 42 to the channel 46, so as to direct all water deposited on said plates into said channel.

This water flowing from the cold ice cans is itself quite cold and as it flows from the channel 46 of the tank around the tortuous passage, it chills the water in pipe 52.

The plates 54 may have an interlocked engagement by tongue and groove 55—56 but this is not essential.

An outlet pipe 57 leads from the tank to the pump 36 so water from the tank may be drawn off by the pump and driven through pipe 34 to the spray nozzles.

In case it is desired to drain the tank the pump may be operated and valve 58 in pipe 37 opened and the water will be carried off.

The cans 38, in which the water is frozen to form the ice blocks, may be filled with water from the pipe system 52 after the same has been chilled and cooled by passing through the tank, consequently the operation of lowering the temperature is much facilitated and the freezing more quickly accomplished in the freezing tank.

After the ice is formed in the cans 38, the latter are removed from the freezing tank and placed directly in the compartments of the dump,—the latter being then in the vertical position shown in full lines in Figs. 1 and 4 of the drawings.

The pump 36 is then operated and the chilled water from the tank is pumped through pipes 57 and 34 to the chamber 24 of the trunnion 22.

From chamber 24, the chilled water passes up through pipe 25 to the rear and right-angle branch pipes 26, 27, 28 and 29 at the top of the dump and this water is discharged through orifices in said pipes against the sides and rear walls of the cans. The chilled water is also directed by the nozzles 30 against the front walls of the cans at the open front sides of the dump and this water flows down the walls of the cans and raises the temperature thereof so as to effect a loosening of the block of ice in the cans.

The water that flows down the walls of the cans is again chilled by contact with the latter and this water also fills the bottom of the dump and flows beneath the cans because the latter are held slightly elevated by the angle-bars 17 in the bottom of the dump.

Water overflowing from the dump is caught in the trough 6 and directed into the tank where it cools the coils of pipe 52 and the water passing therethrough.

Some of the chilled water passing up through pipe 25 to rear pipe 26 is discharged by the elevated nozzles 33, which are located above the cans containing the ice and this water from these nozzles is directed on top of the ice in the cans.

As the ice frees itself from the can-walls, the water deposited on top thereof flows down between the ice-block and the walls of the can confining it, and as the block frees itself from the can, the water in the can under and around the ice block will float the block in the can and the operator can at once see that the ice is free and ready for dumping.

The dumping operation consists in merely turning the dump on the trunnions and allowing the floating ice to slide out from the can onto an inclined structure 39.

When the dump is turned from an upright to an inclined dumping position, the port 35 in the trunnion 22, will cut off from pipe 34 and thereby shut off the flow of water up through pipe 25 and the branches, so that while the actual dumping operation takes place, the water is preferably cut off.

Having described my invention, I claim,—

1. In an apparatus for harvesting artificial ice the combination with a dumping means to hold the cans with the ice therein, of means for directing water against the can while held by the dump whereby such directed water will be chilled, means for accumulating the chilled water running from the cans and connections between the chilled water accumulating means and the means for directing the water against the cans.

2. In an apparatus for harvesting artificial ice the combination with a dumping means to hold the cans with the ice therein, of means for directing water against the can while held by the dump, means for accumulating the chilled water running from the cans, a pump, connections between the pump and the water-directing means and connections between the pump and the chilled water accumulating means whereby the chilled water from the latter means will be supplied to the water-directing means.

3. In an apparatus for harvesting artificial ice the combination with a dumping means to hold cans with ice therein, of means for directing water against the cans of ice while held in the dump, a tank beneath the dump, coiled pipe connected with a water supply system said coiled pipe being in the tank, means for circulating the chilled water around the tank to chill the coiled pipe, a pump, connections between the pump and the water directing means and connections between the pump and the tank.

4. In an apparatus for harvesting artificial ice the combination with a dumping means to hold cans with ice therein, of means for directing water against the cans of ice while held in the dump, a tank beneath the dump, partitions in the tank, piping in the tank and extending around said partitions said piping being connected with a water supply system, inclined plates in the tank over the partitions for directing chilled water from the cans in the dump to one side of the tank, a pump, connections between the pump and the water directing means and connections between the pump and the tank.

5. In an apparatus for harvesting artificial ice the combination with a pivoted dumping means to hold cans with the ice therein, of means, while the can is held upright for depositing water in the top of the cans and on the ice whereby said water may flow down between the can-wall and the ice block and float the ice when it is freed from the can prior to the tilting of the dumping means.

6. In an apparatus for harvesting artificial ice the combination with a pivoted dumping means to hold cans with the ice therein,— said dumping means having side and rear walls and a low front wall extending upwardly from the bottom whereby to form a shallow bottom receptacle, means in said bottom receptacle for holding the cans elevated above the bottom and means for directing a thawing fluid against the vertical walls of the can while the dump is upright.

7. In an apparatus for harvesting artificial ice the combination with a pivoted dumping means to hold cans with ice therein, of means for directing a thawing fluid against the walls of the can while the same and the dump are held upright, and means for depositing water in the top of the can and on the ice while the can is upright whereby said water may flow down between the can wall and ice block and float the ice in the upright can.

8. In an apparatus for harvesting artificial ice the combination with a dumping means to hold the cans with the ice therein, of means for directing water against the cans while held by the dump in an upright position, a receptacle beneath the dump for accumulating the chilled water running from the cans of ice, pipe coils in the receptacle that are cooled by the chilled water in the latter and means for drawing chilled water from the receptacle and directing it against the cans of ice in the upright dump.

In testimony whereof I affix my signature.

EDWARD A. HALL.